United States Patent [19]
Lin

[11] Patent Number: 5,992,859
[45] Date of Patent: Nov. 30, 1999

[54] BIT HOLDING SYSTEM FOR A POWER HAND TOOL

[75] Inventor: Yuan-Ho Lin, Changhua Hsien, Taiwan

[73] Assignee: Chum Power Machinery Corp., Taichung Hsien, Taiwan

[21] Appl. No.: 09/066,695

[22] Filed: Apr. 27, 1998

[51] Int. Cl.$^6$ .................................................. B23B 31/12
[52] U.S. Cl. ............................ 279/62; 279/140; 279/902
[58] Field of Search ............................... 279/61, 62, 140, 279/902

[56] References Cited

U.S. PATENT DOCUMENTS

| | | | |
|---|---|---|---|
| 4,951,955 | 8/1990 | Sakamaki | 279/62 |
| 4,958,840 | 9/1990 | Palm | 279/62 |
| 5,411,275 | 5/1995 | Huff et al. | 279/902 |

*Primary Examiner*—Steven C. Bishop
*Attorney, Agent, or Firm*—Bacon & Thomas

[57] ABSTRACT

A bit holding system includes a transmission block coupled to the transmission shaft of a power hand tool, a plurality of clamping rods obliquely radially mounted in respective oblong holes on the transmission block to hold a bit at a front end of the transmission block, the clamping rods each having a threaded rear end extended out of the transmission block, a first impact member having a tapered, threaded inside wall threaded onto the threaded rear ends of the clamping rods and a plurality of equiangularly spaced and backwardly extended bottom teeth, a spring supported second impact member mounted around the transmission block between the first impact member and the reversible motor drive, the second impact member having teeth acting with the teeth of the first impact member, and a shell for holding down by hand to stop the second impact member from rotary motion, causing it to impact a resisting force to the first impact member upon each rotation cycle of the first impact member when the first impact member is turned with the clamping rods and the transmission block.

4 Claims, 7 Drawing Sheets

BIT HOLDING SYSTEM FOR A POWER HAND TOOL

BACKGROUND OF THE INVENTION

The present invention relates to a power hand tool, and more particularly to a bit holding system for a power hand tool which can be controlled to provide a high torsional force intermittently.

FIG. 1 shows a power hand drill according to the prior art. According to this structure of power hand drill, a transmission block is coupled to the motor shaft of a reversible motor drive, a plurality of clamping rods are obliquely mounted around the transmission block, each clamping rod having a threaded inner end threaded into a respective screw hole on the transmission block, and a control ring for adjusting the position of the clamping rods. The control ring has a serrated front edge. When turning the control ring to adjust the position of the clamping rods, a special T-shaped driving tool is used and inserted into a positioning hole on the casing of the power hand drill to force a bevel gear of the T-shaped driving tool into engagement with the serrated front edge of the control ring, and therefor the control ring is turned when rotating the T-shaped driving tool. Because the T-shaped driving tool must be used to adjust the position of the clamping rods when mounting or dismounting the bit, the T-shaped driving tool must be well kept with the power hand drill.

SUMMARY OF THE INVENTION

It is one object of the present invention to provide a bit holding system for a power hand tool which uses spring means to hold down engaged parts, keeping the engaged parts to be firmly retained together. It is another object of the present invention to provide a bit holding system which can be conveniently controlled to provide a high torsional force intermittently for an efficient drilling operation. It is still another object of the present invention to provide a bit holding system which uses a flexible shell with a smooth outside wall for holding by hand to force the power hand tool to provide a high torsional force intermittently without hurting the user's hand. It is still another object of the present invention to provide a bit holding system which automatically holds down or releases the bit when the reversible motor drive of the power hand tool is started. To achieves these and other objects of the present invention, there is provided a bit holding system which comprises a transmission block coupled to the transmission shaft of a power hand tool, a plurality of clamping rods obliquely radially mounted in respective oblong holes on the transmission block to hold a bit at a front end of the transmission block, the clamping rods each having a threaded rear end extended out of the transmission block, a first impact member having a tapered, threaded inside wall threaded onto the threaded rear ends of the clamping rods and a plurality of equiangularly spaced and backwardly extended bottom teeth, a spring supported second impact member mounted around the transmission block between the first impact member and the reversible motor drive, the second impact member having teeth acting with the teeth of the first impact member, and a shell for holding down by hand to stop the second impact member from rotary motion, causing it to impact a resisting force to the first impact member upon each rotation cycle of the first impact member when the first impact member is turned with the clamping rods and the transmission block. When the reversible motor drive is started, the clamping rods are forced forwards or backwards to hold down or release the bit. When the shell is held down with the hand to stop the second impact member from rotation, the second impact member imparts a resisting force to the first impact member intermittently, and therefore a high torsional force is produced intermittently.

DETAILED DESCRIPTION OF THE PREFERRED EMBODIMENT

Figure 1:
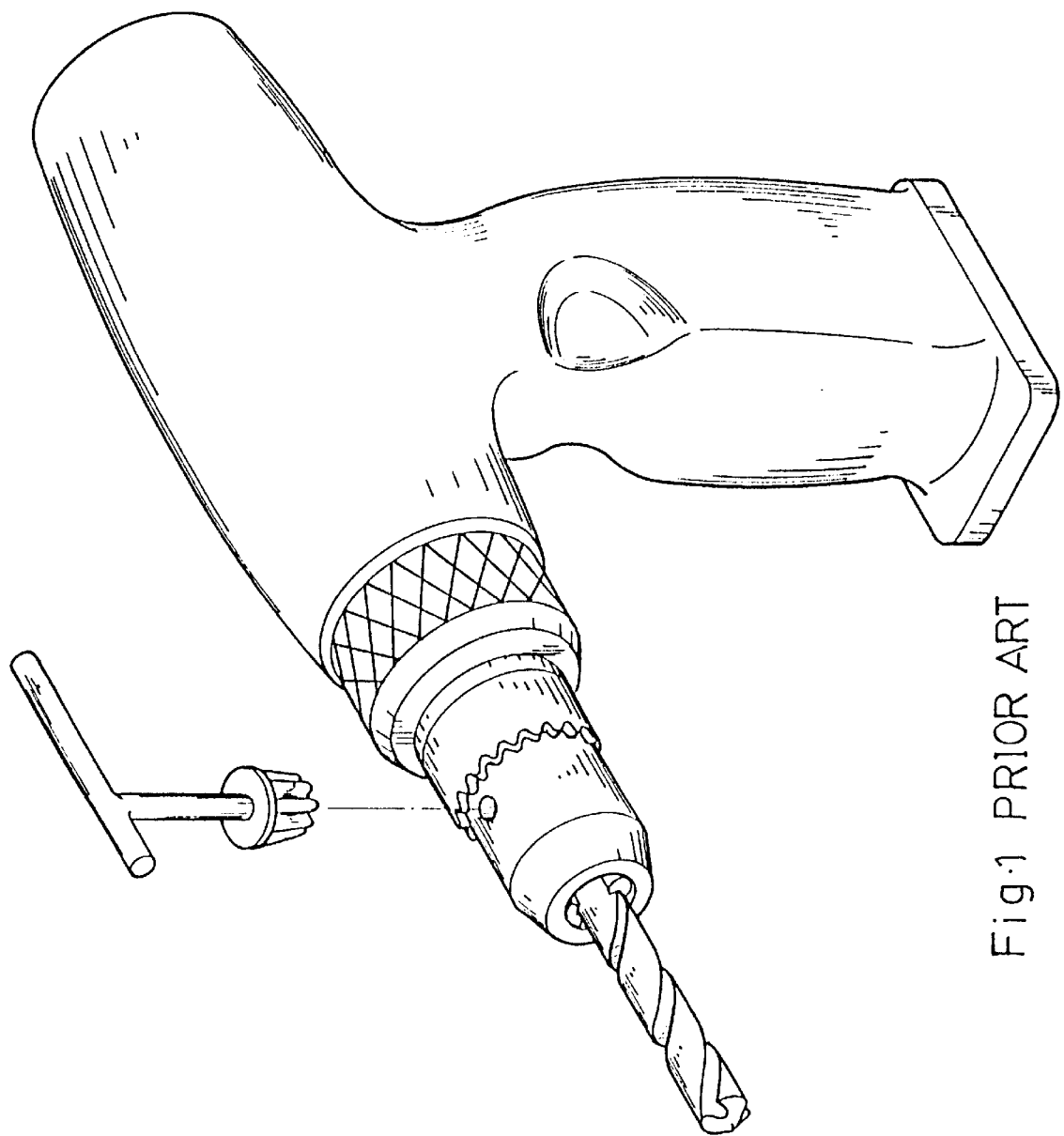
FIG. 1 illustrates a bit fastened to a power hand drill according to the prior art.
Figure 2:
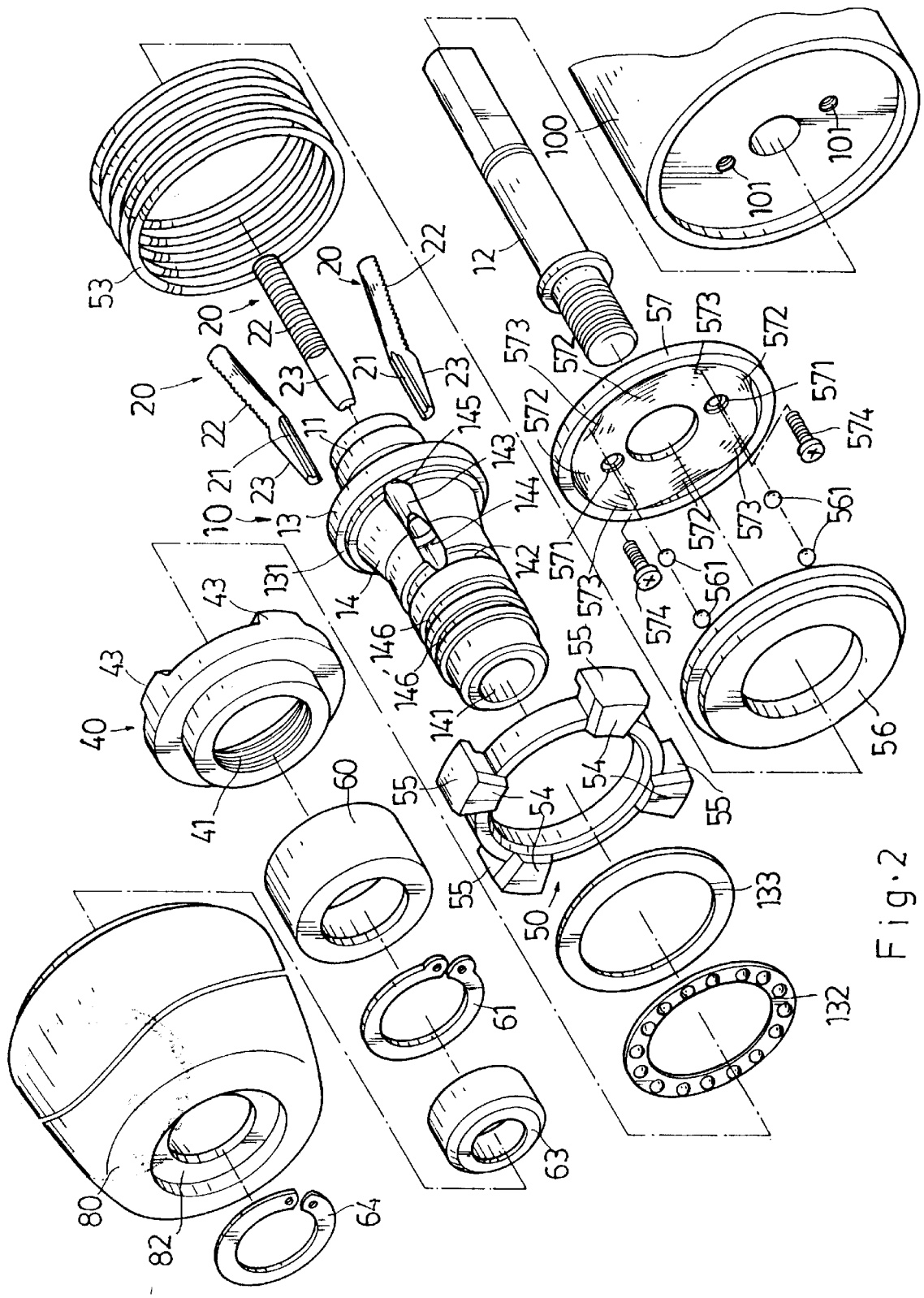
FIG. 2 is an exploded view of a bit holding system for a power hand tool according to a first embodiment of the present invention.
Figure 3:
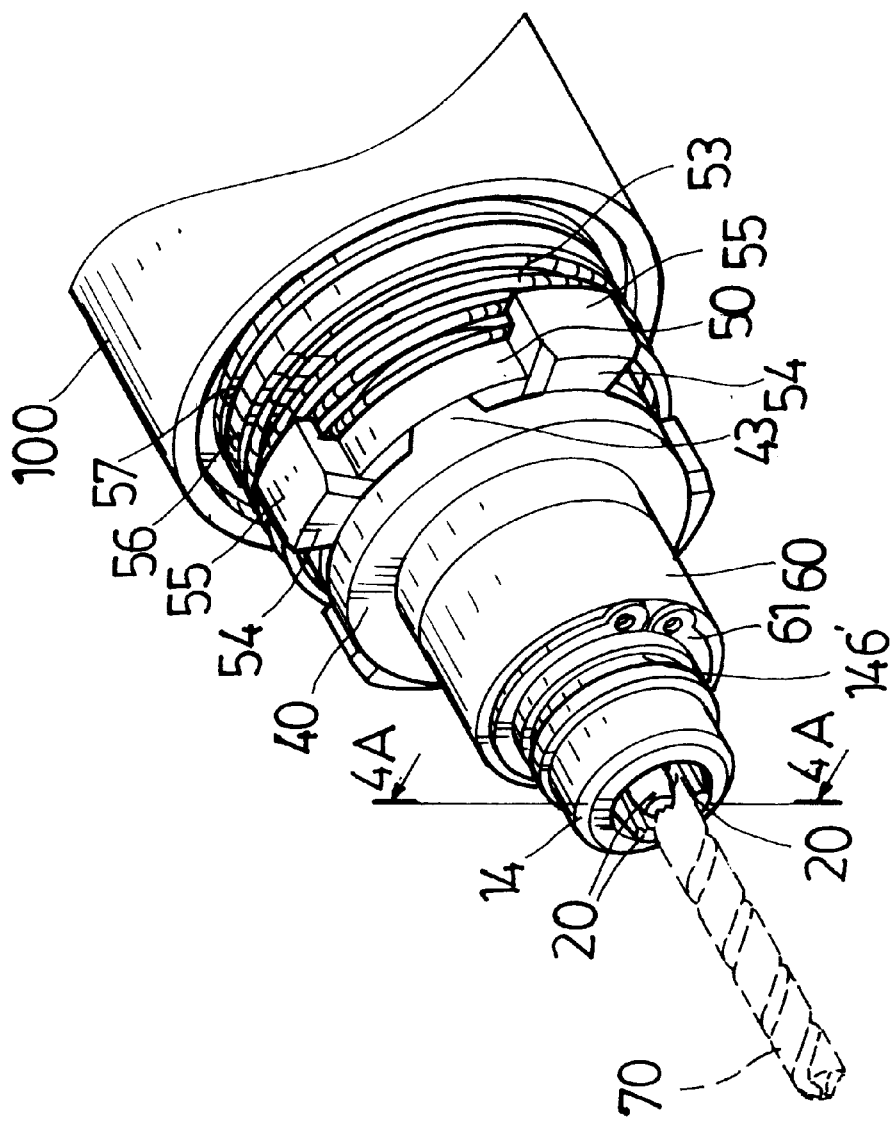
FIG. 3 is an assembly view of the bit holding system shown in FIG. 2.
Figure 4A:
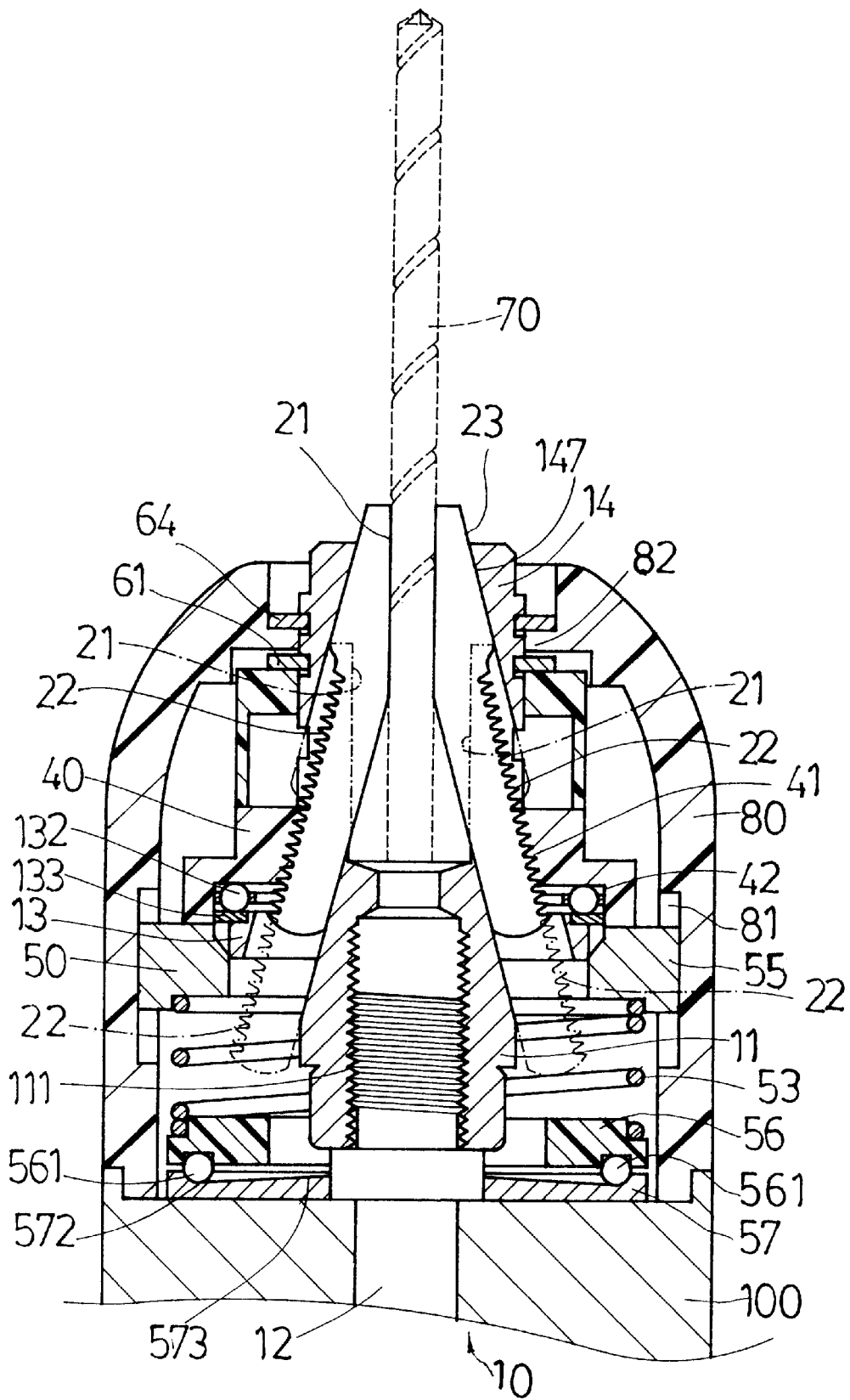
FIG. 4A is a sectional view taken along line 4A—4A of FIG. 3.

Referring to FIGS. 2, 3 and 4, a bit holding system in accordance with a first embodiment of the present invention is generally comprised of a cylindrical transmission block 10, a plurality of clamping rods 20, a first impact member 40, a second impact member 50, a locating barrel 60, and a shell 80.

The cylindrical transmission block 10 comprises a coupling portion 11 at one end, a cylindrical block body 14 at an opposite end in longitudinal alignment with the coupling portion 11, and a collar 13 raised around the periphery between the coupling portion 11 and the cylindrical block body 14. The cylindrical block body 14 has an inner end tapered. The outer diameter of the tapered inner end of the cylindrical block body 14 is gradually increased toward the collar 13. The coupling portion 11 defines a longitudinal mounting hole 111, which receives one end of a transmission shaft 12 of a reversible motor drive 100, enabling the transmission block 10 to be rotated with the transmission shaft 12. The collar 13 has an annular groove 131 around the periphery, and a plurality of equiangularly spaced, axially extended circular through holes 145. A cushion ring 133 is mounted on the annular groove 131 of the collar 13. A ball bearing 132 is supported on the cushion ring 133. The cylindrical block body 14 comprises a circular longitudinal coupling hole 141, an annular locating groove 142 around the periphery on the middle, a plurality of guide grooves 143 equiangularly spaced around the periphery between the annular locating groove 142 and the collar 13 and downwardly sloping from the axially extended circular through holes 145 on the collar 13 toward the annular locating groove 142, a plurality of oblong through holes 144 respectively radially extended from the connecting area between the guide grooves 143 and the annular locating grooves 142 to the longitudinal coupling hole 141, a tapered inside wall portion 147 longitudinally extended from the oblong through holes 114 toward the outside around the longitudinal coupling hole 141, and two longitudinally spaced annular mounting grooves 146;146' spaced around the periphery near one end remote from the collar 13. The tapered inside wall portion 147 has a diameter longitudinally gradually reducing from the oblong through holes 114 toward the outside.

The number of the clamping rods 20 is equal to that of the guide grooves 143. Each clamping rod 20 comprises a front section and a rear section. The front section of each clamping rod 20 comprises a clamping face 21 and a protruded block 23 at opposite sides. The rear section of each clamping rod 20 has a threaded portion 22 at an outer side reversed to the clamping face 21. The front sections of the clamping rods 20 are respectively inserted through the axially extended circular through holes 145 on the collar 13 and the guide grooves 143 into the oblong through holes 144 and the longitudinal coupling hole 141, enabling the protruded blocks 23 to be closely attached to the tapered inside wall portion 147, and the clamping faces 21 to face the longitudinal central axis of the longitudinal coupling hole 141. When installed, the clamping rods 20 are respectively retained to the guide grooves 143 in a sloping position.

The first impact member 40 is an annular member having a tapered, threaded inside wall 41 threaded onto the threaded portions 22 of the clamping rods 20, a rear open chamber 42 which receives the ball bearing 132, and a plurality of teeth 43 longitudinally extended from the rear end thereof and equiangularly spaced around the periphery. Each tooth 43 has two opposite lateral sides longitudinally sloping inwards.

The second impact member 50 is an annular member mounted around the cylindrical transmission block 10, and supported on a spring 53. The spring 53 is supported on an annular cap 56 around the transmission shaft 12, imparting a forward pressure to the second impact member 50. The annular cap 56 holds a plurality of steel balls 561 in equiangularly spaced bottom recesses (not shown) thereof. An annular friction plate 57 is mounted around the transmission shaft 12 and retained between the annular cap 56 and the reversible motor drive 100. The annular friction plate 57 comprises a plurality of through holes 571 fastened to respective mounting holes 101 on the reversible motor drive 100 by screws 574, and a plurality of concave surface portions 572 and convex surface portions 573 alternatively arranged at the front side corresponding to the steel balls 561 on the annular cap 56. The second impact member 50 comprises a plurality of teeth 54 spaced around the periphery corresponding to the teeth 43 of the first impact member 40, and a plurality of protruded blocks 55 respectively extended from the teeth 54.

The locating barrel 60 is a tubular member mounted around the block body 14 of the cylindrical transmission block 10, and secured in place by a clamp 61, which is fastened to one annular mounting groove 146 on the block body 14 of the transmission block 10. Further, a rust-resisting protective cap 63 is covered on the front end of the block body 14 of the cylindrical transmission block 10 around the longitudinal coupling hole 141 to protect the clamp 61.

The shell 80 is a conical member made from flexible material. The both ends of the shell 80 are opened. The outside wall of the shell 80 is a smooth surface. The shell 80 has a plurality of longitudinal grooves 81 on the inside for engagement with the protruded blocks 55 of the second impact member 50, and an annular front mounting recess 82. When the shell 80 is coupled to the protruded blocks 55 of the second impact member 50, a clamp 64 is mounted in the annular front mounting recess 82 and fastened to one annular mounting groove 146' on the block body 14 of the transmission block 10 to secure the shell 80 to the transmission block 10.

When in use, a bit 70 is inserted into the longitudinal coupling hole 141 of the transmission block 10 and retained in place by the clamping faces 21 of the clamping rods 20. The transmission shaft 12 of the reversible motor drive 100 can be rotated clockwise or counter-clockwise, i.e., the bit 7 can be rotated with the transmission shaft 12 in the working direction or the releasing direction. When the transmission shaft 12 is rotated in the working position, the transmission block 10 and the clamping rods 20 are turned with the transmission shaft 12. Because the first impact member 40 is retained between the locating barrel 60 and the collar 13, it is stopped from axial movement. At the initial state of the rotary motion of the transmission block 10, the first impact member 40 is forced by the rotational force of the rotary motion of the transmission block 10 to make a rotary motion. Because the first impact member 40 is supported on the ball bearing 132 around the transmission block 10, the first impact member 40 can be smoothly turned about the transmission block 10. However, because the high revolving speed of the transmission block 10 is much higher than the rotary motion of the first impact member 40, the threaded portions 22 of the clamping rods 20 are still maintained engaged with the threaded inside wall 41 of the first impact member 40, therefore the clamping rods 20 are forced forwards along the guide grooves 143 toward the longitudinal central axis of the longitudinal coupling hole 141 to hold down the bit 70, and the bit 70 is retained to the clamping faces 21 of the clamping rods 20 firmly when the transmission block 10 is continuously rotated. Further, when the clamping rods 20 are firmly clamped on the bit 70, they are stopped from forward movement, and the threaded portions 22 of the clamping rods 20 are fastened tight (i.e., locked) with the threaded inside wall 41 of the first impact member 40. When the threaded portions 22 of the clamping rods 20 and the threaded inside wall 41 of the first impact member 40 are fastened tight, the first impact member 40 is rotated with the transmission block 10, and the second impact member 50 is driven by the teeth 43 of the first impact member 40 to make a rotary motion synchronously.

When releasing the bit 70, the reversible motor drive 100 is controlled to rotate the transmission shaft 12 in the reversed direction namely the releasing direction, causing the engagement between the threaded portions 22 of the clamping rods 20 and the threaded inside wall 41 of the first impact member 40 to be loosened, and therefore the clamping rods 20 are forced to move backwards from the bit 70 along the guide grooves 143 toward the axially extended circular through holes 145, and therefore the bit 70 is released from the clamping rods 20. When the clamping rods 20 are moved backwards to a certain distance, the protruded blocks 23 are stopped by a front edge of the threaded inside wall 41 of the first impact member 40, and therefore the clamping rods 20 do not fall from the transmission block 10.

As indicated above, the clamping rods 20 are moved forwards or backwards during the rotary motion of the transmission shaft 12, therefore the bit 70 is held down or release when the reversible motor drive 100 is started.

When the second impact member 50 is rotated, the spring 53 is driven to rotate the annular cap 56 with the second impact member 50, causing the steel balls 561 to move over the concave surface portions 572 and convex surface portions 573 of the annular friction plate 57. When the steel balls 561 are moved to the convex surface portions 573, the annular cap 56 is forced forwards to push the spring 53, causing the spring 53 to impart a forward pressure to the second impact member 50 against the first impact member 40, and therefore the threaded inside wall 41 of the first impact member 40 and the threaded portions 22 of the clamping rods 80 are fastened tight.

Figure 5:
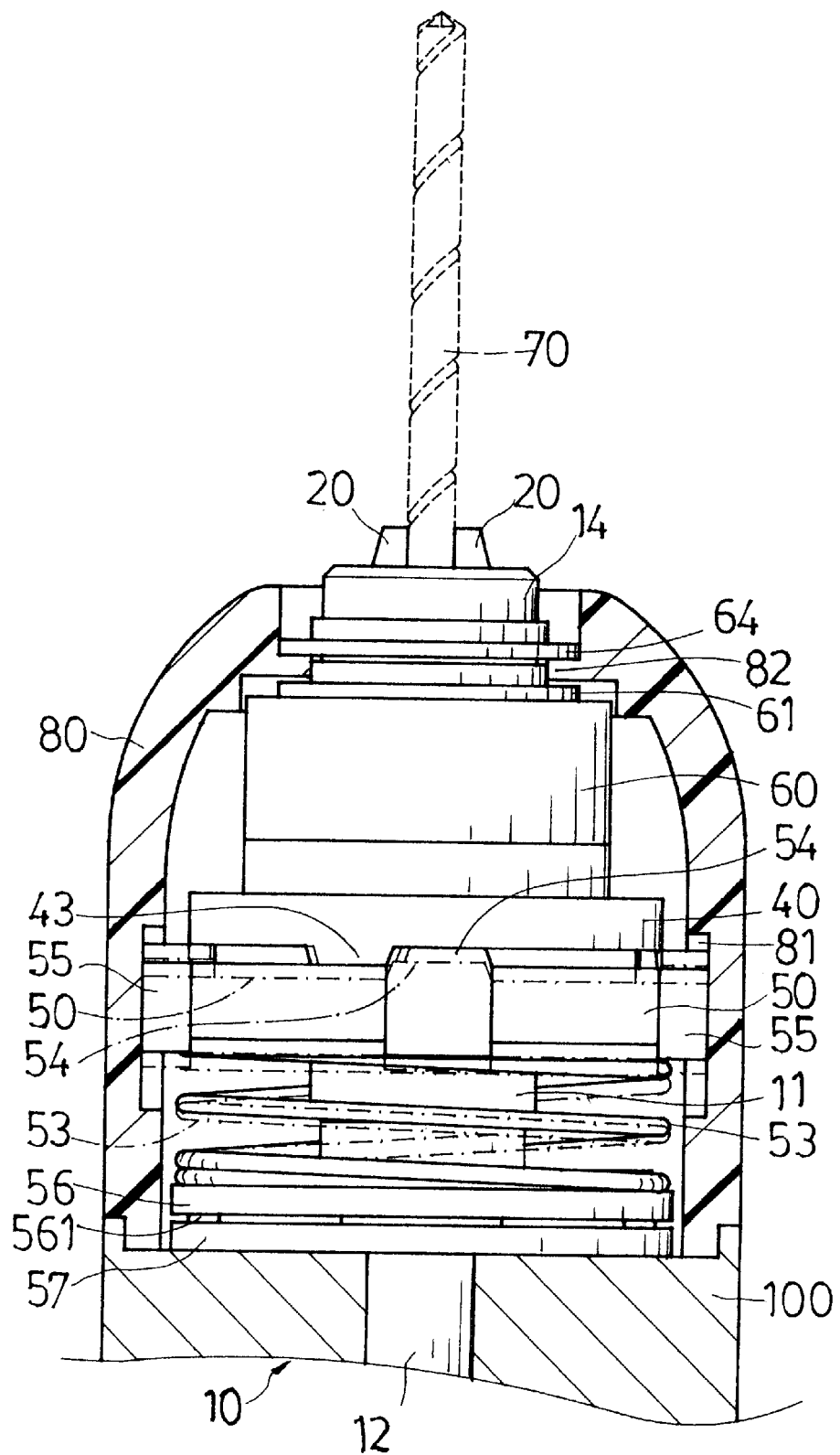
FIG. 5 is a sectional view of the first embodiment of the present invention showing the bit holding system operated.

Referring to FIG. 5, when the bit 70 receives a high resisting force from the workpiece during its rotary motion, the shell 80 is compressed with the hand to stop the second impact member 50 from rotation. Because the shell 80 has a smooth outside wall, compressing the shell 80 with the hand does not hurt the hand. When the second impact member 50 is stopped, the spring 53, the annular cap 56 and the steel balls 561 are stopped. However, when the bit 70 is rotated with the transmission block 10, the first impact member 40 is rotated, and at the same time the teeth 43 of the first impact member 40 are acted against the teeth 54 of the second impact member 50. When the teeth 43,54 meet, the first impact member 40 receives a resisting force, causing the revolving speed of the first impact member 40 to be reduced, and therefore the revolving speed of the transmission shaft 12 is relatively reduced. Because the protruded blocks 55 of the second impact member 50 are engaged into the longitudinal grooves 81 inside the shell 80, the longitudinal grooves 81 provide a sufficient space for allowing the second impact member 50 to be moved axially backwards to compress the spring 53. When the teeth 54 of the second impact member 50 are moved out of the teeth 43 of the first impact member 40, the second impact member 50 is pushed forwards by the spring 53, and the revolving speed of the first impact member 40 is returned to normal. The pitch of the teeth 43 of the first impact member 40 is greater than that of the teeth 54 of the second impact member 50. Therefore, the bit 70 is alternatively rotated at two revolving speeds, causing the torsional force of the bit 70 to be increased.

When the bit 70 is alternatively rotated at two revolving speeds, the engagement between the threaded portions 22 of the clamping rods 20 and the threaded inside wall 41 of the first impact member 40 is secured tight. When the transmission shaft 12 of the reversible motor drive 100 is rotated in the releasing direction, the first impact member 40 is continuously turned with the clamping rods 20, therefore the first impact member 40 and the clamping rods 20 are still maintained engaged. At this time, the user must hold down the shell 80 with the hand to stop the second impact member 50. When the second impact member 50 is stopped from rotation and the teeth 43 of the first impact member 40 are moved to the teeth 54 of the second impact member 50, the first impact member 40 receives a resisting force against its rotary motion. Because the transmission shaft 12 is rotated in the releasing direction, the engagement between the threaded portions 22 of the clamping rods 20 and the threaded inside wall 41 of the first impact member 40 is relatively loosened each time the first impact member 40 receives a resisting force against its rotary motion.

The aforesaid bit 70 can be of any type. For example, the bit 70 can be a drill point for a hand drill, or a tip for a screwdriver.

Figure 6:
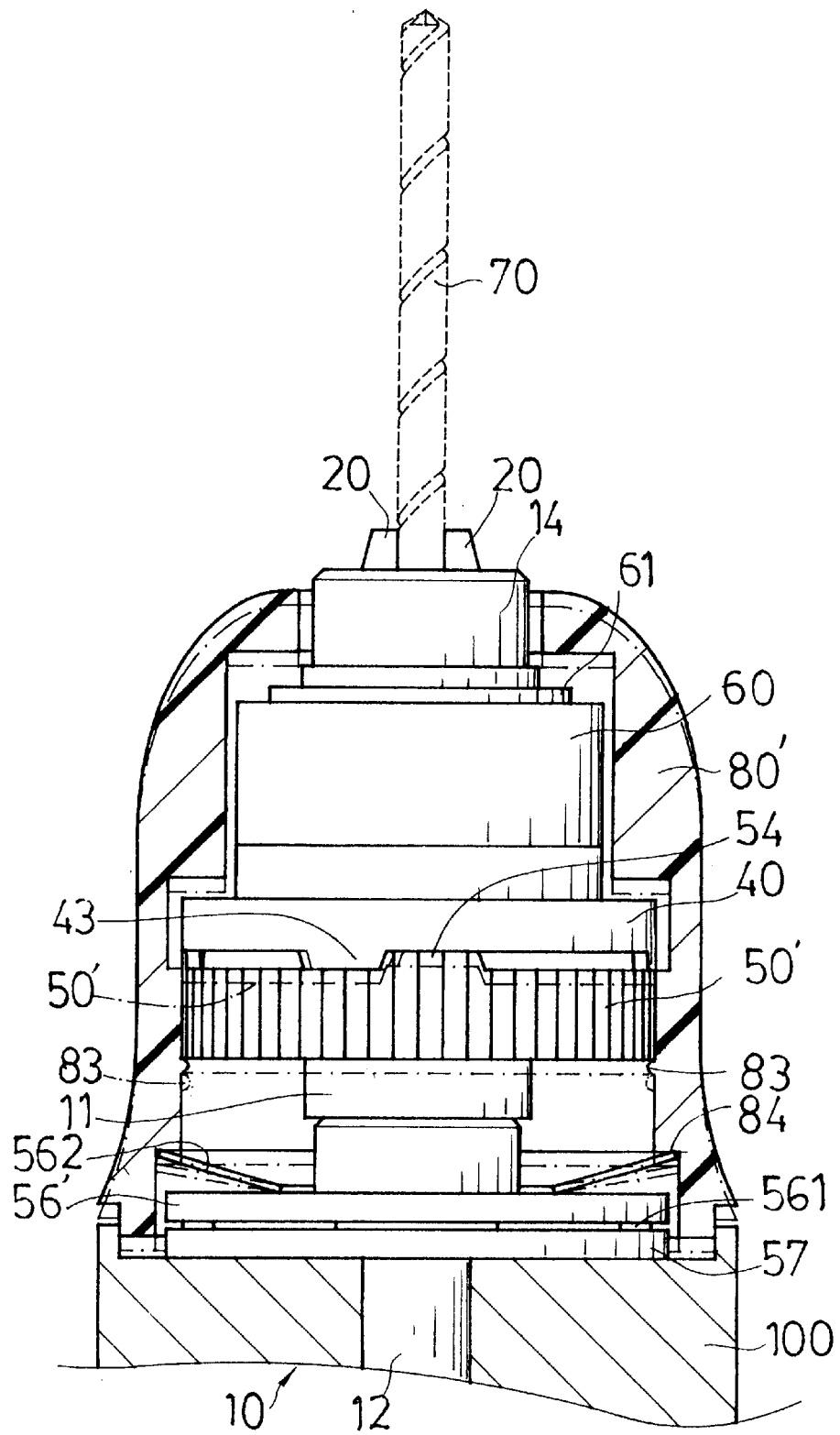
FIG. 6 is a sectional view of the second embodiment of the present invention, showing the bit holding system operated.

FIG. 6 shows a bit holding system according to a second embodiment of the present invention. According to this embodiment, a disk-like spring plate 562 is mounted within the shell 80' to hold down the annular cap 56. The shell 80' of this second embodiment has an inside annular flange 83 pressed on the second impact member 50', and a step 84 stopped at the disk-like spring plate 562 against the annular cap 56. The second impact member 50' has a toothed periphery fitted into the shell 80'. When the second impact member 50' is rotated with the first impact member 40, the shell 80' is driven to make a rotary motion, causing the disk-like spring plate 562 and the annular cap 56' to be rotated with the shell 80'. During the rotary motion of the annular cap 56', the steel balls 561 are moved over the concave convex surface of the annular friction plate 57. When the steel balls 561 are moved to the convex surface portions 573, the disk-like spring plate 562 is forced forwards, causing the shell 80' to push the second impact member 50' with its inside annular flange 83, and therefore the threaded inside wall 41 of the first impact member 40 is forced into tight engagement with the threaded portions 22 of the clamping rods 20.

When holding down the shell 80' with the hand, the second impact member 50' is stopped from rotation. Therefore, the second impact member 50' is forced backwards when the teeth 43 of the first impact member 40 moves over the teeth 54 of the second impact member 50'. Because the second impact member 50' is stopped at the inside annular flange 83 of the shell 80', the shell 80' is moved backwards with the second impact member 50' when the second impact member 50' receives a backward pressure from the first impact member 40. When the teeth 43 of the first impact member 40 are moved away from the teeth 54 of the second impact member 50', the disk-like spring plate 562 immediately pushes the shell 80' and the second impact member 50' to their former positions. Therefore, when the shell 80' is compressed with the hand to stop the second impact member 50' during the rotary motion of the transmission block 10, the shell 80' is moved back and forth, and the bit 70 is alternatively rotated at two different speeds.

Figure 7:
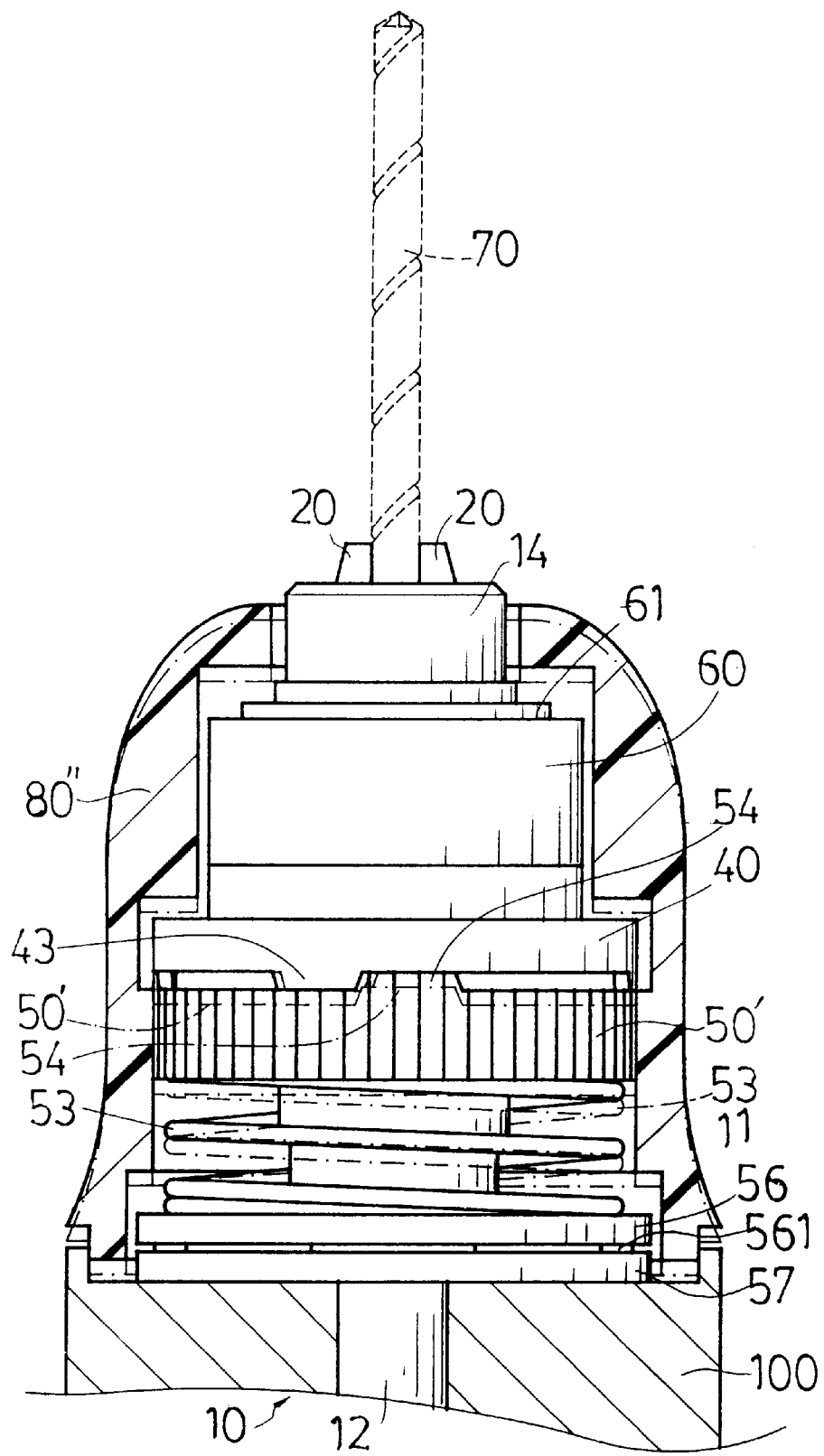
FIG. 7 is a sectional view of the third embodiment of the present invention, showing the bit holding system operated.

FIG. 7 shows a bit holding system according to a third embodiment of the present invention. According to this embodiment, the periphery of the second impact member 50' is toothed, the spring 53 is connected between the second impact member 50' and the annular cap 56 and imparts a forward pressure to the second impact member 50', and the steel balls 561 are moved with the annular cap 56 over concave surface portions 572 and convex surface portions 573 of the annular friction plate 57. The shell 80" of the third embodiment has a smooth outside wall, and its structure is similar to that shown in FIG. 6, however the shell 80" of the third embodiment eliminates the aforesaid inside annular flange 83 because the second impact member 50' is pushed forwards by the spring 53.

What is claimed is:

1. A bit holding system comprising:

a transmission block coupled to the transmission shaft of a reversible motor drive and turned with the transmission shaft;

a plurality of clamping rods obliquely radially mounted in respective oblong holes on said transmission block to hold a bit at a front end of said transmission block, said clamping rods each having a threaded rear end extended out of said transmission block;

a first impact member mounted around said clamping rods outside said transmission block and turned with said clamping rods and said transmission block, said first impact member having a tapered, threaded inside wall threaded onto the threaded rear ends of said clamping rods, and a plurality of equiangularly spaced and backwardly extended bottom teeth;

a locating barrel mounted around one end of said transmission block remote from said transmission shaft and secured in place to limit forward movement of said first impact member on said transmission block;

a second impact member mounted around said transmission block between said first impact member and the reversible motor drive, said second impact member having a plurality of equiangularly spaced teeth for acting against the teeth of said first impact member to impart a resisting force to said first impact member;

spring means connected between said second impact member and said reversible motor drive, said spring means imparting a forward pressure to said second impact member; and wherein said second impact member has a plurality of protruded blocks spaced around the periphery; a flexible shell is coupled to said transmission block and covered around said first impact member, said second impact member and said clamping rods, said shell comprising a smooth outside wall, an inside wall spaced around said first impact member and said clamping rods, a plurality of longitudinal sliding grooves on the inside wall which receive the protruded blocks of said second impact member, and an annular front mounting recess; a clamp is mounted in the annular front mounting recess of said shell and fastened to said transmission block to stop said shell in place; said second impact member is stopped from rotation when said shell is held down with the hand during the rotary motion of said transmission block.

2. The bit holding system of claim 1 wherein said second impact member has a toothed periphery engaged with an inside wall portion of said shell; said spring means is a disk-like spring plate pressed on an annular cap covered on the reversible motor drive; said shell comprises an inside annular flange raised around the inside wall thereof which supports said second impact member.

3. The bit holding system of claim 2 wherein said annular cap is covered on an annular friction plate at said reversible motor drive and turned with said transmission block relative to said annular friction plate, said annular friction plate having a plurality of concave surface portions and convex surface portions alternatively arranged around the center, said annular cap holding a plurality of steel balls in bottom recessed holes thereof, said steel balls being moved over the concave surface portions and convex surface portions of said annular friction plate when said annular cap is turned with said transmission block.

4. The bit holding system of claim 3 wherein said annular friction plate is fixedly fastened to a casing of said reversible motor drive by a plurality of fastening elements.

\* \* \* \* \*